United States Patent [19]
Holzmann

[11] Patent Number: 5,826,017
[45] Date of Patent: Oct. 20, 1998

[54] APPARATUS AND METHOD FOR COMMUNICATING DATA BETWEEN ELEMENTS OF A DISTRIBUTED SYSTEM USING A GENERAL PROTOCOL

[75] Inventor: Gerard Johan Holzmann, Murray Hill, N.J.

[73] Assignee: Lucent Technologies, Murray Hill, N.J.

[21] Appl. No.: 830,291

[22] Filed: Feb. 10, 1992

[51] Int. Cl.$^6$ .................................................. G06F 11/00
[52] U.S. Cl. ..................... 395/200.6; 395/285; 395/500; 370/401; 370/428; 370/465; 370/466; 370/467; 370/468; 370/469
[58] Field of Search ................................ 398/200, 500, 398/225; 370/401, 467, 428, 465, 466, 469; 395/200.6, 200.5, 500

[56] References Cited

U.S. PATENT DOCUMENTS

| | | | |
|---|---|---|---|
| 4,545,052 | 10/1985 | Steierman | 370/68 |
| 4,688,170 | 8/1987 | Waite et al. | 395/500 |
| 4,733,357 | 3/1988 | Peirent | 364/200 |
| 4,754,400 | 6/1988 | Wakahara et al. | 395/180 |
| 4,855,905 | 8/1989 | Estrada et al. | 364/200 |
| 4,970,716 | 11/1990 | Goto et al. | 370/58.1 |
| 5,063,494 | 11/1991 | Davidowski et al. | 395/800 |
| 5,142,528 | 8/1992 | Kobayashi et al. | 370/79 |
| 5,163,055 | 11/1992 | Lee et al. | 371/32 |
| 5,175,817 | 12/1992 | Adams et al. | 395/200 |
| 5,182,748 | 1/1993 | Sakata et al. | 370/94.1 |
| 5,245,703 | 9/1993 | Hubert | 395/200 |
| 5,276,802 | 1/1994 | Yamaguchi et al. | 395/164 |
| 5,276,816 | 1/1994 | Cavendish et al. | 345/348 |
| 5,278,972 | 1/1994 | Baker et al. | 395/500 |
| 5,313,467 | 5/1994 | Vargheses et al. | 370/94.1 |
| 5,347,524 | 9/1994 | I'Anson et al. | 371/29.1 |
| 5,430,727 | 7/1995 | Callon | 370/85.13 |
| 5,452,433 | 9/1995 | Nihart et al. | 395/500 |
| 5,557,798 | 9/1996 | Skeen et al. | 395/650 |
| 5,574,919 | 11/1996 | Netravali et al. | 395/561 |
| 5,581,558 | 12/1996 | Horney, II et al. | 370/401 |
| 5,594,721 | 1/1997 | Pan | 370/392 |
| 5,623,666 | 4/1997 | Pike et al. | 707/200 |
| 5,659,555 | 8/1997 | Lee et al. | 371/27.1 |
| 5,680,552 | 10/1997 | Netravali et al. | 395/200.2 |

FOREIGN PATENT DOCUMENTS

| | | | |
|---|---|---|---|
| EP-A-0289248 | 4/1988 | European Pat. Off. | G06F 13/38 |

OTHER PUBLICATIONS

Gerard J. Holzmann, "Standardized Protocol Interfaces", AT&T Bell Labs, Murray Hill, N.J., Oct. 18, 1992.

J. E. Boillat, et al "Communication Protocols and Concurrency: An OCCAM Implementation of X.25", 1988 International Zurich Seminar on Digital Communications, Mar. 8, 1988, pp. 99–102.

M. H. Sherif, et al "Evaluation of Protocols from Formal Specifications: A Case Study with LAPD", IEEE Global Telecommunications Conf., vol. 3, Dec. 2, 1990, San Diego, pp. 879–886.

Chesson, G., "The Protocol Engine Project", Unix Review, Sep. 1987.

Toong, H.–M., "Microprocessors", Sci. Am., vol. 237, No. 3, p. 146, Sep. 1977.

*Primary Examiner*—Christopher B. Shin

[57] ABSTRACT

Apparatus and methods for communicating using protocols. The apparatus and methods employ protocol descriptions written in a device-independent protocol description language. A protocol is executed by employing a protocol description language interpreter to interpret the protocol description. Communication using any protocol for which there is a protocol description may be done by means of a general protocol. The general protocol includes a first general protocol message which includes a protocol description for a specific protocol. The protocol apparatus which receives the first protocol message employs a protocol description language interpreter to interpret the included protocol description and thereby to execute the specific protocol. The protocol apparatus may also be made to adapt to its environment by encaching protocol descriptions which were received in an earlier first general protocol message and interpreting an encached protocol description in response to a second general protocol message which includes a protocol identifier specifying the encached protocol description.

46 Claims, 8 Drawing Sheets

FIG. 4
401

INSTRUCTION SET – GENERAL 403

0. STACK MANAGEMENT AND EXPRESSION EVALUATION

| | |
|---|---|
| PLUS,MINUS,UMIN,TIMES,DIVIDE,MODULO | arithmetic operations |
| AND,OR,GT,LT,GE,LE,EQ,NE,NOT | boolean operations |
| SHIFTL,SHIFTR,BIT_AND,BIT_OR,XOR,BIT_COMPL | bitwise operators |
| L_PUSH_BYTE,L_PUSH_WORD | push a constant onto the stack |
| L_PUSH_BYTE_VAR,L_PUSH_WORD_VAR | push a variable onto the stack, constant operands |
| PUSH_BYTE_VAR,PUSH_WORD_VAR | push a variable onto the stack |

INSTRUCTION SET – PROTOCOL RELATED 405

| MNEMONIC | PARAMETERS | PURPOSE |
|---|---|---|
| 1. FSM CONTROL | | |
| LOAD | 2(buffer nr,state nr) | assign a new state definition |
| NXT | 1(state nr) | perform a state transition |
| IF,ELSE | 1(value) | conditional execution of commands |
| 2. UPPER INTERFACE | | |
| ACCEPT | 1(buffer nr) | pass a message to the upper layer |
| OBTAIN | 1(buffer nr) | fetch a new message from the upper layer |
| 3. LOWER INTERFACE | | |
| RECV | 1(buffer nr) | receive a message from the lower layer into buffer |
| SEND | 1(buffer nr) | send a message to the lower layer from buffer |
| CKSUM | 1(buffer nr) | calculate a checksum on buffer contents |
| BYTEORDER | 1(constant) | define byte-order of lower layer |
| WORD_SZ | 1(constant) | number of bytes per word on lower layer |
| 4. BUFFER MANAGEMENT | | |
| ALLOC | 2(buffer,maxsize) | allocate bufferspace for buffer |
| SETSIZE | 2(buffer,size) | define the length field of a message in buffer |
| SETTIMO | 2(buffer,time) | define a timeout period for a message in buffer |
| CPY_BYTE | 3(buffer,index,value) | set a byte-value in a message |
| CPY_WORK | 2(buffer,start_index,value) | set a work (N bytes) |

GENERAL PROTOCOL APPARATUS
1323

FIG. 8
801

```
/* Receiver Buffers */
#define RBUF     0      /* receive buffer */
#define TBUF     1      /* transmit buffer */
#define VAR_E    2      /* variable 'e' - receiver side    */
/* Transmitter Buffers */
#define M0       0      /* message m0 */
#define M1       1      /* message m1 */
#define R_run    2      /* Abp_rcv_run    */
#define R_ini    3      /* Abp_rcv_ini    */
#define R_ack    4      /* receive buffer - for acks    */
#define VAR_S    5      /* variable 's' - sender side     */
#define VAR_CNT  6      /* variable 'cnt' - sender side   */
#define B_0      1      /* byteorder */
#define NR_MSGS  32765  /* number of test messages sent */
```

803 marks the #define block

```
BYTE Abp_rcv_ini[] = {        /* initialization Buf[r_ini]; recvd in State[0] */
/*0*/   BYTEORDER,   B_0,
/*2*/   I_ALLOC,     TBUF, 2,
/*5*/   I_SETSIZE,   TBUF, 2,
/*8*/   I_ALLOC,     VAR_E, 1
/*11*/  I_RECV,      RBUF,
/*13*/  I_LOAD,      1, RBUF, /* input becomes State[1] */
/*16*/  I_NXT,       1,       /* execute it */
/*18*/  0,           0,       /* room for the checksum; required on 1st msg */
};
```

805

```
BYTE Abp_rcv_run[] = {     /* abp receiver Buf[R_run]; recvd in State[1] */
/*0*/   I_RECV,           RBUF,
/*2*/   I_CPY_BYTE,       TBUF, 0,     'A',
/*6*/   I_PUSH_BYTE_VAR,           RBUF,  1,
/*9*/   H_CPY_BYTE,       TBUF, 1,
/*12*/  I_SEND,           TBUF,
/*14*/  I_PUSH_BYTE_VAR,           RBUF,  1,
/*17*/  I_PUSH_BYTE_VAR,           VAR_E, 0,
/*20*/  EQ,
/*21*/  IF,               34,          /* e == rbuf[1] */
/*23*/                    I_PUSH_BYTE,     1,
/*25*/                    I_PUSH_BYTE_VAR,VAR_E, 0,
/*28*/                    MINUS,
/*29*/                    H_CPY_BYTE,      VAR_E, 0,
/*32*/                    I_ACCEPT,        RBUF,
/*34*/  I_NXT,     1               /* stay in same state */
};
```

807

```
BYTE Msg0[] = { /* message Buf[M0], received in Buf[RBUF] */
    'M', 0
};
BYTE Msg1[] = { /* message Buf[M1], received in Buf[RBUF] */
    'M', 1
};
```

```
/* sender behavior */
BYTE Abp_snd_ini[] = {                          /* becomes State[0] */
/*0*/    I_ALLOC,        VAR_S, 1,              /* the byte variable 's' */
/*3*/    I_CPY_BYTE,     VAR_S,0,0,             /* s = 0 */
/*7*/    I_ALLOC,        VAR_CNT,2,             /* the word variable 'cnt' */      903
/*10*/   I_CPY_WORD,     VAR_CNT, 0, 0,         /* cnt = 0 */
/*14*/   I_SEND,         R_ini,                 /* send Buf[R_ini] == Abp_rcv_ini */
/*16*/   I_SEND,         R_run,                 /* send Buf[R_run] == Abp_rcv_run */   905
/*18*/   I_NXT,          1                      /* begin actual behavior */
};

BYTE Abp_snd_run[] = {                          /* becomes State [1] */
/*0*/    I_PUSH_BYTE_VAR, VAR_S, 0,
/*3*/    SEND,                                  /* send from buf[s] */
/*4*/    I_RECV,         R_ack,                 /* recv into buf[r_ack] */
/*6*/    I_PUSH_BYTE_VAR,R_ack, 0,              /* look at Buf[R_ack].cont[0] */
/*9*/    I_PUSH_BYTE,    'A',
/*11*/   EQ,
/*12*/   IF,             32,                    /* #12 - #13 */
/*14*/       I_PUSH_BYTE_VAR, R_ack, 1,         /* Buf[R_ack].cont[1] */
/*17*/       I_PUSH_BYTE_VAR, VAR_S, 0,         /* s */
/*20*/       EQ,
/*21*/       IF,         32,      /* #21 - #22 */
/*23*/           I_PUSH_BYTE,    1,
/*25*/           I_PUSH_BYTE_VAR, VAR_S, 0,                                            907
/*28*/           MINUS,
/*29*/           H_CPY_BYTE,     VAR_S, 0, /* s = 1 - s */
/*32*/   I_PUSH_BYTE,    1,      /* #32 - #33 */
/*34*/   I_PUSH_WORD_VAR,VAR_CNT, 0,
/*37*/   PLUS,
/*38*/   H_CPY_WORD,     VAR_CNT, 0,            /* cnt = 1 + cnt */
/*41*/   I_PUSH_WORD_VAR,VAR_CNT, 0,
/*44*/   I_PUSH_WORD,    NR_MSGS>>8, NR_MSGS&255,
/*47*/   GE,                                    /* cnt >= NR_MSGS */
/*48*/   IF,             54,      /* #48 - #49 */
/*50*/       I_PUSH_WORD, 255, 255,             /* -1 = exit */
/*53*/       NXT,
/*54*/   I_NXT,          1        /* #54 - #55 stay in this state */
};
```

```
                        1003
transition(n)
{       BYTE b1, *cur_state = State[n].cont;
        static   int Stack[SMAX+1];
        register BYTE *prot;  ——— 1005
        register int w0, w1, w2, i;
        register int *sp = &Stack[SMAX];

prot = cur_state;  ——1006
        while (prot) {      ——1009
1007/       switch (*prot++) {

/*** FSM CONTROL ***/ case NXT:
                    assert(sp < &Stack[SMAX]);
                    w0 = POP;
1011                debug("next %d0, w0, 0, 0, 0);
                    if (w0 < 0 || w0 > SMAX || !State[w0].cont)
                            return ERRORSTATE;
                    return w0;
            case I_NXT:
                    w0 = *prot++;
                    debug("next %d0, w0, 0, 0, 0);
1013                if (w0 < 0 || w0 > SMAX || !State[w0].cont)
                            return ERRORSTATE;
                    return w0;
            . . .

default:
1015                debug("Error <%d>0, *prot, 0, 0, 0);
                    return ERRORSTATE;
            }  }
}
```

```
BYTE   Bootstrap[] = {
/*0*/   I_RECV, RBUF,                      /* receive message into RBUF       */
/*2*/   I_CKSUM, RBUF,                     /* always checksum initial msg    */
/*4*/   IF, 10,                            /* if nonzero goto instruction #10 */
/*6*/   I_PUSH_WORD, BOOTSTRAP>>8, BOOTSTRAP&255,
/*9*/   NXT,                               /* stay in bootstrap state        */
/*10*/  I_PUSH_BYTE_VAR, RBUF, 0,          /* get variable Buf[RBUF].cont[0] */
/*13*/  I_PUSH_BYTE, BYTEORDER,
/*15*/  NE,                                /* Buf[RBUF].cont[0] != BYTEORDER */
/*16*/  IF, 22,                            /* if false goto instruction #22  */
/*18*/  I_PUSH_WORD, ERRORSTATE>>8, ERRORSTATE&255,
/*21*/  NXT,
/*22*/  I_LOAD, 0,        RBUF,            /* it checks out, define State[0] */
/*25*/  I_NXT, 0                           /* and execute it                 */
};
```

```
BYTE   Errorstate[] = {
/*0*/   I_ALLOC,      TBUF, 1,
/*3*/   I_SETSIZE,    TBUF, 1,
/*6*/   I_CPY_BYTE,   TBUF, 0, ERRORMSG,
/*10*/  I_SEND, TBUF,
/*12*/  I_RECV, RBUF,
/*14*/  I_CKSUM,      RBUF,
/*16*/  IF, 22,                            /* if nonzero move to instruction #22 */
/*18*/  I_PUSH_WORD, ERRORSTATE>>8, ERRORSTATE&255,
/*21*/  NXT,
/*22*/  I_PUSH_BYTE,VAR,RBUF, 0,
/*25*/  I_PUSH_BYTE,  NXT,
/*27*/  EQ,                                /* Buf[RBUF].cont[0] == NXT          */
/*28*/  IF, 18,                            /* if false move to instruction #18  */
/*30*/  I_PUSH_WORD_VAR, RBUF, 1,
/*33*/  NXT
};
```

APPARATUS AND METHOD FOR COMMUNICATING DATA BETWEEN ELEMENTS OF A DISTRIBUTED SYSTEM USING A GENERAL PROTOCOL

BACKGROUND OF THE INVENTION

1. Field of the Invention

The invention pertains to communications in distributed systems generally and specifically to protocols.

2. Description of the Prior Art

A computer protocol is a set of rules that governs the interaction of concurrent processes in a distributed computing system. For example, if computer A, connected to a disk drive containing files, wishes to print out one of the files on a printer connected to computer B, it can do so only if computer A has agreed with computer B on a protocol for doing so. The protocol must define matters such as the following:

How does computer A ask computer B whether the printer is available?

How does computer B tell computer A that the printer is or is not available?

How does computer A tell computer B that it is starting to send data?

How does computer B tell computer A to slow down the speed at which computer A is sending data or to stop sending?

How does computer B tell computer A to resume sending?

How does computer A tell computer B it is done sending?

How does computer B tell computer A that it is done printing?

A general discussion of computer protocols may be found in Gerard J. Holzmann, *Design and Validation of Computer Protocols*, Prentice Hall, Englewood Cliffs, N.J. 1991.

Among the difficulties of implementing computer protocols are those which are consequences of the fact that the entities which execute a protocol are often different. For example, computer A and computer B of the foregoing example may be different kinds of machines. In other cases, the entities executing the protocol may be programs written in different programming languages. Because each of the entities which cooperate to execute the protocol must contain an implementation of at least its part of the protocol, there will be as many different implementations of at least parts of the protocol as there are different cooperating entities.

One of the difficulties which arises from this situation is the need to reimplement each protocol for each kind of entity which executes it. As the number of protocols and kinds of entities grows, more and more implementation effort is involved. An even more important difficulty is caused by the fact that the implementations of the same protocol for different entities are often done by different people; if the different people have different understandings of the protocol, the implementations may not be completely compatible and it will be hard to determine where they are incompatible and what the effects of any incompatibility will be.

The apparatus and methods disclosed in the following overcome these problems and others by permitting all entities which execute a protocol to execute the same description of the protocol.

SUMMARY OF THE INVENTION

In one aspect of the invention, the invention is a peripheral apparatus for communicating information using a protocol. The apparatus includes means for transferring the information according to the protocol;

means for transferring the information between the peripheral apparatus and a host device;

means independent of the host device for storing a protocol description which describes the protocol and which employs a protocol description language which is independent of any particular implementation of the peripheral apparatus; and protocol description interpretation means which is independent of the host device and which is capable of interpreting the protocol description language for interpreting the protocol description as required to transfer the information according to the protocol via the means for transferring the information according to the protocol and to transfer the information via the means for providing the information to the host device.

In another aspect, the invention is a method of communicating in a distributed system. The method includes the steps of:

in a first entity of the distributed system, receiving a first general protocol message which includes a protocol description which describes a specific protocol, the protocol description employing a protocol description language which is independent of any particular implementation of the first entity; and responding to the first general protocol message by employing first protocol description interpretation means capable of interpreting the protocol description language to interpret the protocol description as required to communicate using the specific protocol.

In still another aspect, the invention is protocol apparatus for communicating in a distributed system, the apparatus including:

means for receiving a first general protocol message, the first general protocol message including a protocol description which describes a specific protocol and which employs a protocol description language which is independent of any particular implementation of the protocol apparatus; and means for responding to the first general protocol message which are capable of interpreting the protocol description language and which interpret the protocol description as required to communicate using the specific protocol.

In a further aspect, the invention is apparatus for communicating in a distributed system, the apparatus including:

first protocol apparatus for communicating using a general protocol and second protocol apparatus for communicating using the general protocol, the first protocol apparatus including means for providing a first general protocol message which includes a protocol description which describes a specific protocol and which employs a protocol description language which is independent of any particular implementation of the second protocol apparatus; and means for employing the specific protocol to communicate with the second protocol apparatus after providing the first general protocol message; and the second protocol apparatus including means for receiving the first general protocol message from the first protocol apparatus; and means for responding to the first general protocol message which are capable of interpreting the protocol description language and which interpret the protocol description as required to communicate using the specific protocol.

The foregoing and other aspects, objects and advantages of the invention will be apparent to one of ordinary skill in the art who peruses the following Drawings and Detailed Description, wherein:

BRIEF DESCRIPTION OF THE DRAWING

FIG. 4 is a table of instructions in a protocol description language;

FIG. 8 is a protocol description for the receive side of the alternating bit protocol;

FIG. 9 is a protocol description for the send side of the alternating bit protocol;

FIG. 10 is a fragment of the transition procedure;

FIG. 11 is a protocol description for the bootstrap state;

FIG. 12 is a protocol description for the error state; and

Figure 1:
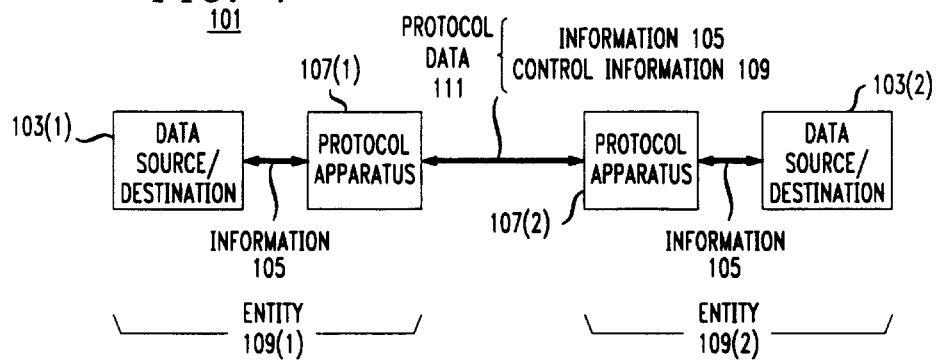
FIG. 1 is a block diagram of a typical system in which protocols are used.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Detailed Description will first provide an overview of the techniques of the invention and will then disclose in detail how the Alternating Bit Protocol (described at Holzmann, supra, pp. 75–77) may be implemented using the techniques of the invention.

Figure 2:
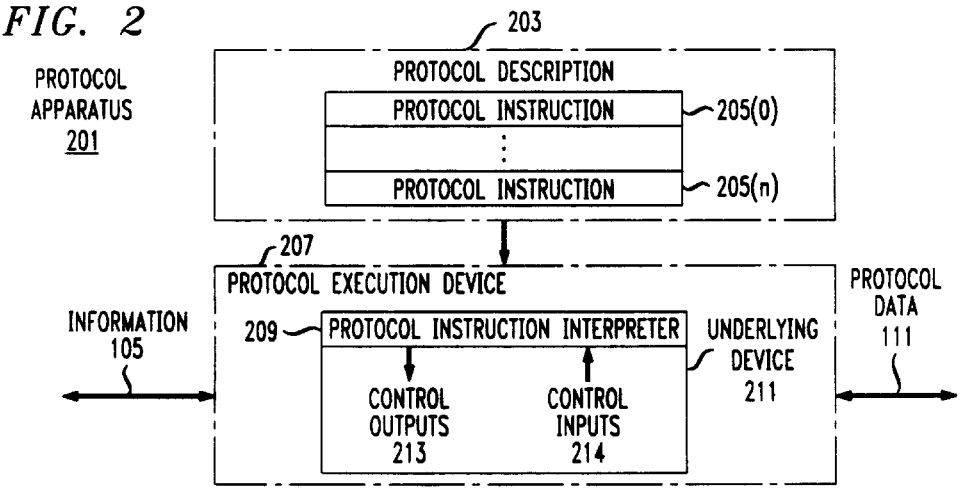
FIG. 2 is a block diagram of a first apparatus incorporating the invention.
Figure 3:
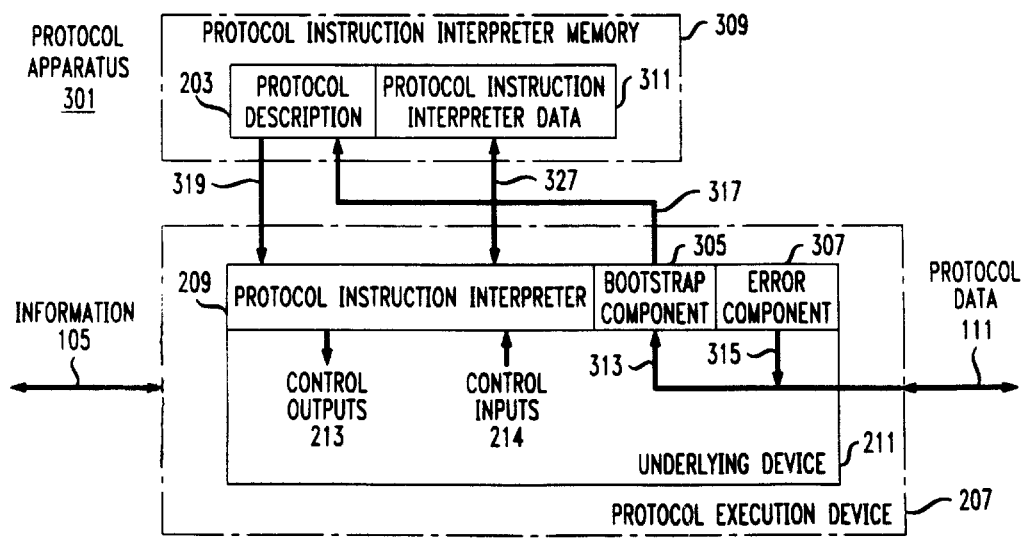
FIG. 3 is a block diagram of a second apparatus incorporating the invention.

Overview: FIGS. 1–3

FIG. 1 is a block diagram of a system 101 in which protocols are used for communication between a first entity 109(1) and a second entity 109(2). Each entity 109 includes a source or destination 103 for information (INFO) 105 and a protocol apparatus 107.

As shown by the arrows, when entity 109(1) is communicating with entity 109(2), information 105 goes from source 103(1) to protocol apparatus (PA) 107(1), which employs a protocol as described above to transfer information 105 to protocol apparatus 107(2). As explained above, the connection between protocol apparatus 107(1) and protocol apparatus 107(2) carries not only information 105, but also the control information 109 which protocol apparatus 107(1) and 107(2) require to carry out the protocol. The information 105 and control information 109 together make up protocol data (PDATA) 111. Protocol apparatus 107(2) then provides the information 105 which it receives to destination 103(2). When entity 109(2) communicates with entity 109(1), information 105 from source 103(2) goes to protocol apparatus 107(2), protocol apparatuses 107(1) and 107(2) carry out the protocol, which this time transfers the information from protocol apparatus 107(2) to protocol apparatus 107(1), and protocol apparatus 107(1) provides the information to destination 103(1).

A system of the type shown in FIG. 1 may be built in many different fashions and may be used in many environments. For example, protocol apparatus 107(1) and 107(2) may be connected by any kind of communications medium, including parallel and serial buses, telecommunications media and shared memory. Further, entities 109 may be processes running in a single system or processes running in different systems. Further, the communication may be between different levels of the same system or between different systems. Finally, the apparatus 107 may be implemented as a process executing in a multiprocess system or in special purpose hardware, or as some combination of these alternatives.

Because it is the purpose of a protocol to communicate between different entities 109 and protocol apparatus 107 is in each case part of the entity 109, it is almost always the case that protocol apparatus 107(1) and protocol apparatus 107(2) are implemented by different individuals. That fact has important consequences. As explained in Holzmann, supra, it is extremely difficult to provide a description of a protocol which is both complete and unambiguous. When the description is incomplete or ambiguous, different individuals will implement protocol apparatus 107 which execute different versions of the protocol, and if two protocol apparatuses 107 which execute different versions of the protocol attempt to communicate using the protocol, the communication may fail. Worse, because the failures are the results of different interpretations of the protocol description, the manner of failure will be unpredictable and therefore cannot be taken into account in the design of the protocol. While a complete and unambiguous protocol description can reduce the problem, it does not eliminate it: the individuals implementing apparatus 107 can still have different understandings of the protocol description, and their implementations of apparatus 107 will reflect their understandings. Again, the result is the implementation of protocol apparatuses 107 which execute different versions of the protocol, and again, there is the risk that communications between entities employing such apparatuses 107 will fail.

FIG. 2 illustrates a protocol apparatus 201 which solves the foregoing problem. Protocol apparatus 201 has two main components: protocol description 203 and protocol execution device 207. Protocol description 203 is a protocol description which is written using protocol instructions 205 belonging to a protocol description language. The protocol description language is independent of any particular hardware or software implementation of protocol apparatus 201. There is a single protocol description 203 for the protocol, and every protocol apparatus 201 has a copy of part or all of the single protocol description 203. Protocol execution device 207 executes the protocol by executing the protocol instructions in protocol description 203. The protocol instructions 205 are executed by means of protocol instruction interpreter 209. Protocol instruction interpreter 209 can interpret all of the instructions belonging to the protocol description language. As it interprets each instruction, it produces control outputs 213 to underlying device 211, which actually receives information 105 and provides protocol data 111. Underlying device 211 may in turn provide control inputs 214 to protocol language interpreter 209. Underlying device 211 may be implemented in software, in hardware, or in a combination. Depending on how underlying device 211 is implemented, control outputs 213 may include procedure calls or subroutine addresses, interprocess communications, instructions for a processor in underlying device 211, or control outputs to hardware devices. In the latter case, protocol execution device 207 may be a specialized microprocessor which executes instructions in the protocol description language. Again depending on how underlying device 211 is implemented, control inputs 214 may include data returned by a procedure or a subroutine, data returned by an interprocess communication, the results of executions of instructions, or interrupts.

An implementation of protocol apparatus 201 which is particularly advantageous is an implementation as a peripheral device for a source or destination 103 such as a host computer. Such an implementation would be connected between the medium over which protocol data 111 is to be transferred and a bus of the host computer and would include its own memory for storing protocol description 203 and its own protocol execution device 207. In such an implementation, protocol execution device 207 might be implemented as a processor which is capable of directly executing protocol instructions 205. A particularly advantageous form of such a peripheral device would be one which was implemented in a single integrated circuit.

Protocol apparatus 201 has numerous advantages over protocol apparatus 107. First, every protocol apparatus 201 uses a copy of a single protocol description 203; thus, there is no possibility that different implementations of protocol apparatuses 201 will implement different versions of the protocol. Second, protocol description 203 is written only once, but will be used many times. It is therefore worthwhile to expend great efforts to ensure that protocol description 203 is in fact a correct, complete and unambiguous description of the protocol. Third, the part of protocol apparatus 201 which may differ in the different implementations is protocol execution device 207. However, protocol execution device 207 must now only be able to correctly execute the protocol instructions 205 in protocol description 203. That is, the problem is no longer the correct implementation of the protocol, but rather the correct implementation of an instruction set in a single device. This problem is, however, far better understood than the problem of implementing a protocol in two devices, and consequently, implementations of the protocol instruction set in different protocol apparatuses 201 are far more likely to be correct than implementations of the protocol itself.

Figure 13:
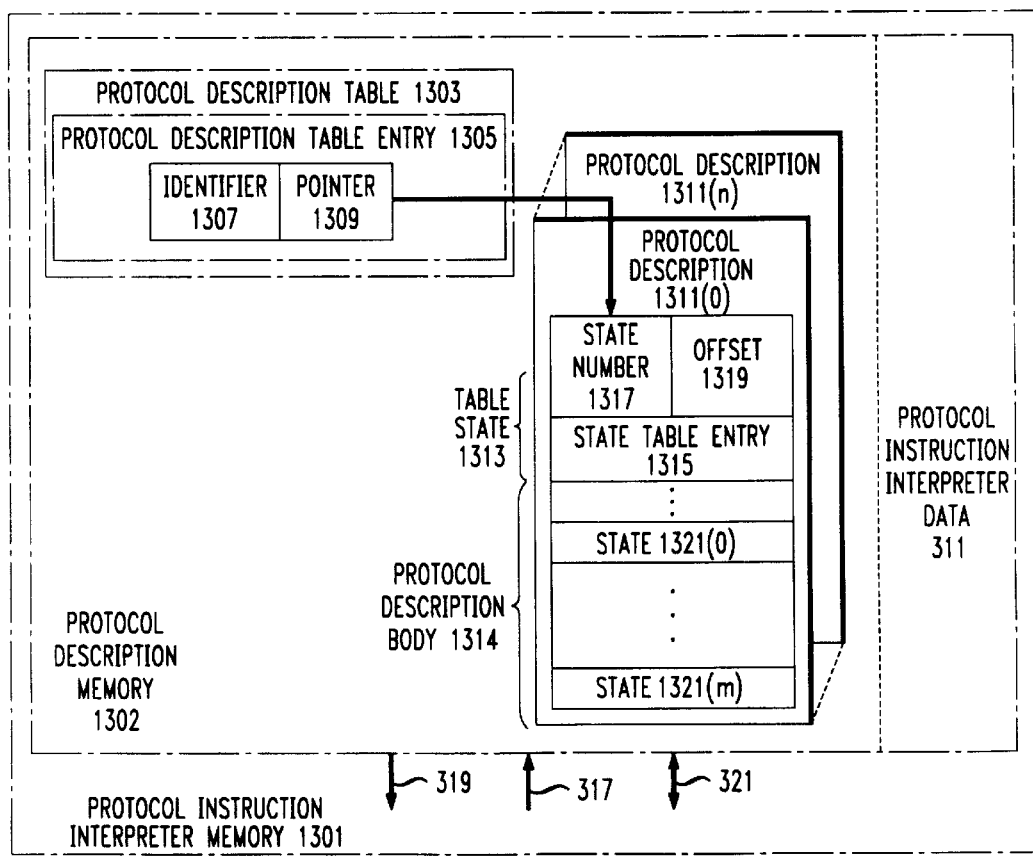
FIG. 13 is a block diagram of an embodiment which encaches down-loaded protocol descriptions.

Apparatus for Executing a General Protocol: FIGS. 3 and 13

Perhaps the most significant advantage of protocol apparatus 201 is that it can execute any protocol for which there is a protocol description 203 written in the protocol description language. Consequently, protocol apparatus 201 can easily be modified to make a general protocol apparatus which executes a general protocol and which can therefore dynamically execute any protocol for which there is a protocol description 203. The general protocol is simply the following:

in a sending protocol apparatus, sending a general protocol message which includes a protocol description 203;

in a receiving general protocol apparatus, employing protocol instruction interpreter 209 to execute the protocol description 203 contained in the general protocol message.

FIG. 3 shows such a general protocol apparatus 301. General protocol apparatus 301 includes protocol instruction interpreter memory (PIIM) 309, which contains protocol description 203 for the protocol currently being executed by protocol apparatus 301 and protocol instruction interpreter data (PIIDATA) 311, which is data employed by protocol instruction interpreter 209 in executing protocol description 203. Protocol interpreter 209 has two additional components: bootstrap component (BOOT) 305 and error component (ERR) 307. These components make it possible for general protocol apparatus 301 to execute the general protocol, and thereby make it possible for any protocol apparatus 107 which can provide a protocol description 203 to protocol apparatus 301 to use the protocol described in the protocol description 203 to communicate between the entities 109 to which protocol apparatus 107 and protocol apparatus 301 belong. Of course, both protocol apparatuses involved in the communication may be general protocol apparatuses 301.

Protocol apparatus 301 executes the general protocol as follows: bootstrap 305 listens for a general protocol message (indicated by arrow 313) from the other protocol apparatus. In a preferred embodiment, the general protocol message uses the same path between the protocol apparatuses as does protocol data 111. In other embodiments, there may be a special path for the general protocol message. The general protocol message further contains at least the first part of protocol description 203 for the specific protocol to be executed. When bootstrap 305 receives the general protocol message, it loads the message into a buffer in protocol instruction interpreter data 311 and performs checks as described below. If the message passes the checks, bootstrap 305 loads the general protocol message into the portion of memory 309 reserved for protocol description 203. Thereupon, interpreter 209 begins executing the protocol instructions 205 in the message, beginning with the initial instruction. If protocol description 203 is longer than the maximum size of an general protocol message, then the first part of protocol description 203 contains protocol instructions which, when executed, cause the rest of protocol description 203 to be loaded.

In a preferred embodiment, the general protocol requires that the general protocol message contain checking information which permits error checking and protocol data information which indicates how protocol instruction interpreter 209 is to interpret protocol data 111 and that the receiving general protocol apparatus 301 use the checking information and the protocol data information. In the preferred embodiment, there are two items of checking information: a checksum for the general protocol message and a required first instruction. On receiving the general protocol message, bootstrap 305 computes the general protocol message's checksum and compares it with the checksum in the message; if they are different, there has been a transmission error and bootstrap 305 waits for another general protocol message. If bootstrap 305's check of the required first instruction in the general protocol message indicates that the general protocol message is not a protocol description 203, the error component 307 of protocol instruction interpreter 209 returns an error message (indicated by arrow 315) to the protocol apparatus 101 which provided the general protocol message. Thereupon, error 307 waits for a valid general protocol message. Once the general protocol message has been successfully received, it is executed by protocol instruction interpreter 209, and as part of the execution, the protocol data information in the general protocol message is used to set parameter values in protocol instruction interpreter data 309.

If both protocol apparatuses 107 involved in a communication are protocol apparatuses 301, an enormous amount of flexibility is possible. For example, if an entity 109 which includes a protocol apparatus 301 requires that information 105 sent to it be sent according to a given protocol, the apparatus 301 can respond to a general protocol which specifies another protocol by returning an error message which indicates that it only responds to a given specific protocol and then sending protocol description 203 for the given specific protocol to the entity from which it received the general protocol message. Such a tactic might be used by an entity 109 which requires that all data which it receives be encrypted according to a particular scheme.

Similarly, if a communication between two entities 109 involves different types of data and different protocols are better for transferring data belonging to the different types, then two protocol apparatuses 301 could carry out the communication by dynamically changing the protocols as required by the type of data currently being communicated. An example here might be a data transfer which involved both digital data representing analog signals and digital data representing numbers or characters. The two types of data have different degrees of tolerance for transmission errors, and the protocol used for each type of data might therefore employ different error checking and correction techniques.

Adaptive General Protocol Apparatus: FIG. 13

The flexibility of general protocol apparatus 301 comes at a cost: each communication using a specific protocol includes the overhead of sending protocol description 203 for the specific protocol to general protocol apparatus 301, checking the general protocol message, and loading protocol description 203 into protocol instruction interpreter memory 309. This overhead can be avoided by equipping general protocol apparatus 301 with a protocol instruction interpretation memory 1301 (FIG. 13) which is large enough to hold a number of protocol descriptions 203 and modifying the general protocol to permit use of a protocol description identifier specifying one of the protocol descriptions in place of a protocol description 203. For such an adaptive general protocol apparatus, the general protocol would be as follows:

In a sending protocol apparatus, sending a first message which includes a protocol description identifier for a protocol description 203;

In a receiving general protocol apparatus, responding to the first message by:
  a. determining whether the receiving general protocol apparatus has a copy of protocol description 203 specified by the identifier;
  b. if it does, executing the protocol description 203 specified by the identifier;
  c. if it does not, returning an error message indicating that it does not have a copy of the specified protocol description 203;

in the sending protocol apparatus, responding to the error message by sending a second message which includes protocol description 203; and in the receiving protocol apparatus, responding to the second message by:
  a. storing protocol description 203 in the receiving protocol apparatus; and
  b. executing the protocol description.

As may be seen from the foregoing description of the general protocol for the adaptive general protocol apparatus, such a general protocol apparatus would quickly adapt itself to the environment in which it was employed. It would in short order contain copies of the protocol descriptions 203 for all of the protocols which were frequently employed by the entities 109 which used the adaptive general protocol apparatus, and would consequently only very rarely need to request a copy of the protocol description 203 for a protocol from the sender. Put another way, an adaptive general protocol apparatus will encache protocol descriptions 203 for frequently-used protocols in the same way that a memory system encaches frequently-used memory blocks.

An adaptive general protocol apparatus may be implemented by modifying bootstrap 303 and the contents of protocol instruction interpreter memory 301. The modifications to the contents of protocol instruction interpreter memory for an adaptive general protocol apparatus 1323 are shown in FIG. 13. As before, protocol instruction interpreter memory 1301 is divided into two parts, one containing data 311 used during execution of a protocol, and one for protocol descriptions. Here, protocol description memory (PDM) 1302 contains a protocol description table 1303 and one or more protocol descriptions 1311. Protocol description table 1303 contains a protocol description table entry 1305 for each protocol description 1311 in memory 1309. Each entry 1305 contains at least two pieces of information: an identifier 1307 for a protocol description 1311 and a pointer 1309 to the location in memory 1302 of protocol description 1311 specified by the identifier. There are many possible sources for the identifiers; for example, the identifier for a given protocol description 1311 may be the description 1311's checksum. In another embodiment, the source of the original protocol descriptions from which the protocol descriptions 1311 are copied may assign a unique identifier to each original protocol description.

As will be explained in more detail below, the protocol descriptions 203 employed in a preferred embodiment define a finite state machine. Consequently, a given protocol description 203 is divided into a set of numbered states (S) 1321. To permit location of the states, protocol description 1311 is divided into two parts: protocol description body (PDB) 1314, which contains the instructions for the states, and state table 1313, which relates state numbers to the locations of the corresponding states 1321. There is an entry 1315 in state table 1313 for each state 1321 in the protocol description body, and each entry contains the state number (SN) 1317 and the offset (OFF) 1319 of that state from the beginning of protocol description 1311.

The modifications required in bootstrap 305 will be immediately apparent from FIG. 13 and the description of the general protocol for general protocol apparatus 1323. When a general protocol message is received which contains a protocol description identifier for which the protocol description 1311 is in memory 1302, bootstrap 305 simply causes interpreter 209 to begin executing the specified protocol description; otherwise, bootstrap 305 retains the identifier from the general protocol message and causes error 307 to return an error message and wait for a message which contains the protocol description 1311. When the message arrives, error 307 causes bootstrap 305 to compare the retained identifier with the identifer in the general protocol message containing the protocol description 1311, and if they agree, bootstrap 305 places the protocol description 1311 in memory 1302 and makes an entry 1305 for the new protocol description 1311 in protocol description table 1303.

Of course, many variations on the above arrangements are possible. For example, memory 1302 is necessarily finite; consequently, bootstrap 305 may have to remove one protocol description 1311 to make room for another. One way of doing this would be to include size and most recent use information in protocol description table 1303, and bootstrap 305 could use that information to determine which protocol descriptions 1311 should be removed. Further, the general protocol for general protocol apparatus 1323 might include a checksum in the general protocol message for the protocol description 1311 identified by the identifier. Bootstrap 305 could use the checksum to make sure that the copy of the protocol description 1311 in memory 1302 was the same as the copy held by the sender. If it was not, bootstrap 305 could send an error message requesting the protocol description and then proceed as previously described for protocol descriptions for which there was no copy in memory 1302.

Implementation of Protocol Apparatus 301

A prototype implementation of protocol apparatus 301 has been constructed in which protocol execution device 207 is a computer capable of executing programs written in the well-known "C" programming language. In the prototype implementation, protocol instructions 205 belonging to a protocol description language are interpreted by a protocol instruction interpreter which is written in C and is executed by a process running on the computer. General protocol apparatus 301 has been tested by writing a protocol description 203 for the alternating bit protocol in the protocol description language and executing the protocol by executing the protocol description 203. The following discussion will first disclose the protocol description language, then protocol interpreter 209, bootstrap 305, and error component 307, and finally protocol description 203 for the alternating bit protocol.

The Protocol Description Language: FIG. 4

FIG. 4 shows the instructions in a preferred embodiment of protocol description language 401. The instructions fall into two classes: those which perform general stack management and expression evaluation, shown in table 403, and those which perform operations which are particularly related to the execution of protocols, shown in table 405.

As is apparent from table 403, protocol instruction interpreter 209 is a stack machine. The stack, maintained in protocol instruction interpretation data 311, is a standard integer size push-down stack. The PUSH_BYTE and PUSH_WORD instructions permit data to be pushed onto the push-down stack. The other instructions take their operands and parameters from the top of the stack and push their results back onto the top of the stack. When a stack overflow or underflow occurs, interpreter 209 ceases executing the protocol, error component 307 sends an error message to the other protocol apparatus 107, and error component 307 then waits for an error handling message from the other protocol apparatus 107. Of course, how the other protocol apparatus 107 responds to the error message is part of the protocol described in protocol description 203. The same thing happens if an arithmetic error such as a zero divide or an integer overflow occurs.

The functions of the instructions in table 405 are generally clear from the table; however, certain instructions require a more detailed explanation. Beginning with the instructions in finite state machine control 407, instructions 421 and 423 permit protocol detestation language 401 to describe a protocol as a finite state machine, that is, a finite set of states with definitions of transitions between the states. Thus, LOAD instruction 421 takes two parameters from the top of the stack, one specifying a buffer which contains a sequence of instructions of protocol description language 401, and one specifying a state number. The LOAD instruction loads the contents of the buffer into a location in protocol description 203 and associates the state number with that location. NXT instruction 423 pops a state value from the top of the stack and begins execution of the sequence of instructions at the location in protocol description 203 associated with the state value. IF instruction 425 is a conditional branch instruction: the IF instruction pops the value at the top of the stack, and if the value at the top of the stack is equal to 0, the IF instruction branches to the instruction specified in the IF instruction's parameter; otherwise, it executes the instruction following the IF instruction.

Upper interface instructions 409 pass information 105 to data source/destination 103 and receive information 105 from data source/destination 103. The information is passed from and received into buffers in protocol instruction interpretation data 311. Lower interface instructions 41 1 deal with PDATA 111 sent and received between protocol apparatuses 107. Three of these instructions are used in bootstrapping. CKSUM 413 computes the checksum of a buffer's contents and places the result in the top of the stack, where it can be used to determine whether a branch should be made to error component 307. BYTEORDER defines the order of the bytes in the words of PDATA 111 which are sent according to the protocol. WORD_SZ defines the number of bytes in the words of PDATA 111 which are sent according to the protocol. Both instructions are used in the general protocol message to override default byte orders and word sizes, and they may be also used to change these aspects of PDATA 111 during transmission of a protocol. Buffer management instructions 419 allocate and size buffers in PII-DATA 311 and permit values from the top of the stack to be written to positions in the buffers. Most of the instructions also have a slightly faster variant (indicated by the prefix I_) which use constant operands specified in the instruction and therefore do not have to pop an operand from the stack.

The following is a short example program written in protocol description language 401. The program first defines the byte order and word size for the protocol, loads the contents of a buffer RBUF into protocol description 203 and associates a state number represented as S with the location of the loaded contents, and then begins executing the contents as state S:

| | | |
|---|---|---|
| BYTEORDER, | 1, | /* Most Significant Byte transmitted first */ |
| WORD_SZ, | 3, | /* 3 bytes per word */ |
| I_LOAD, | S, RBUF, | /* assign RBUF to S */ |
| I_NXT, | S, | /* goto state S*/ |

S is a constant value, as is RBUF, so I_LOAD and I_NXT are used in the program instead of LOAD and NXT.

While protocol description language 401 effectively describes protocols, a person implementing any substantial protocol would not want to write the protocol description directly in language 401. To avoid this problem, the person implementing the protocol can describe the protocol in any formal protocol specification language that can be translated into language 401 and then translate the description in the formal specification language into language 401. Even a regular programming language would do to describe the protocol. If the protocol is specified in a formal protocol specification language which permits validation of the protocol (see for example the PROMELA specification language, in Holzmann, supra, p. 91ff.), there is an added advantage that the complete protocol can be validated exhaustively before it is converted into protocol description language 401. In this case, it will be certain that both sides of the protocol are implemented in precise accordance with the validated model.

Protocol Instruction Interpreter 209

In a preferred embodiment, protocol instruction interpreter 209 is implemented by means of a run procedure which will be explained in more detail later. At the heart of that procedure is the procedure transition(n). A fragment of transistion(n) is shown in FIG. 10. transition (n) 1001 executes the protocol instructions 205 in one state until a NXT or I_NXT instruction transfers control to another state. The procedure is invoked with a single argument: the number of the state to which transition is to be made; when the procedure returns, it returns the number of the next state to which a transition is to be made. The variable cur_state is set on entry into the procedure to point to the beginning of the state specified by the argument. The register variable prot contains the current byte position in the state being executed. At 1006, prot is set to the value of cur_state, so that execution starts at the first byte of the state. The while loop indicated at 1007 continues to execute as long as prot has a non-0 value, i.e., essentially until a return statement transfers control out of transition.

The body of the while loop is a switch statement which contains a case for each of the instructions in protocol description language 401. On each iteration of the loop, the variable prot is incremented by 1, so that it points to the next byte in the state. The value of that byte determines which case is executed. If there is no case corresponding to that value, default case 1015 is executed, which puts interpreter 209 into the error state and thereby transfers control to error 307. Where required, a case further contains debugging code and assertions to check whether requirements for the execution of the instruction are fulfilled. If interpreter 209 is only used with fully tested and verified protocol descriptions 203, the assertions and debugging code may be disabled.

Figure 5:
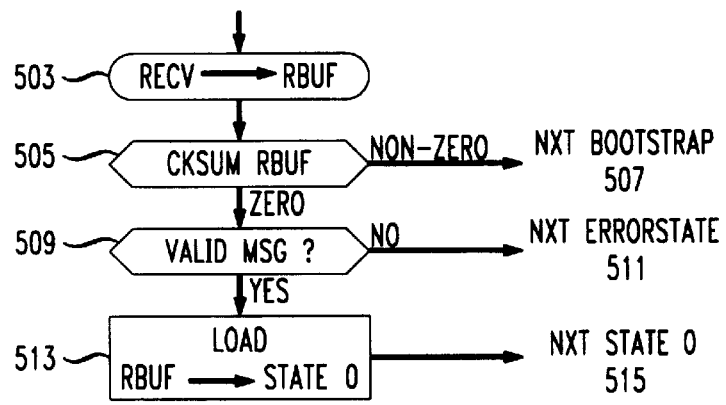
FIG. 5 is a flowchart of the bootstrap state.

Fragment 1001 shows two cases in addition to default case 1015: those for NXT and I_NXT. With NXT 1011, the case simply pops the value at the top of the stack (i.e., the next state), checks whether the value is in the range of values for states, and returns the value. With I_NXT, the value of the next state is in the code, and not on the stack, so the case increments prot by one, checks whether the value at that point in the code is within the range, and returns the value.
Implementation of Bootstrap 305: FIG. 5

In a preferred embodiment, Bootstrap 305 is implemented as a state of interpreter 209. Unlike the other states, which are defined by the protocol description loaded in by bootstrap 305, bootstrap 305 and error 307 are required for the execution of the general protocol and therefore must be built into a protocol apparatus 301 before a protocol description 203 can be loaded.

Since these two states are required for the general protocol, they are the only ones that enforce a predefined format on incoming messages, and that must require, the presence of certain kinds of data to permit checking of the general protocol message. As soon as these two states have successfully received a general protocol message with protocol description 203, they hand off control of the general protocol apparatus to the protocol description 203.

In a preferred embodiment, bootstrap 305 is implemented with a single call run (BOOTSTRAP). Procedure run ( ) is the implementation of interpreter 209 in a preferred embodiment. The procedure is reproduced completely below

```
run (s)
{
        int n = s;
        while (n >= 0 && n <= SMAX && State[n].cont)
            n = transition(n);
        return n;
}
``` run is a loop which invokes the procedure transition with a state number transition then puts interpreter 209 into the proper state of protocol description 203 or the states which implement bootstrap 305 or error 307. The loop ceases execution when a value which is out of range of the legal state numbers is received. Thus, when invoked with BOOTSTRAP, a constant indicating the bootstrap state, the run simply puts interpreter 209 into the bootstrap state.

Most of the concepts involved in implementing an embodiment of protocol apparatus 301 can be illustrated using an implementation of bootstrap 305. In a protocol apparatus 301 employing such an implementation, the code for bootstrap 305 would always be present in protocol instruction interpreter memory 309.

For a general understanding of bootstrap 305, the flow chart of FIG. 5 suffices. As shown in oval 503, bootstrap implementation 501 waits for the general protocol message from the remote protocol apparatus 107. When the message comes, it is loaded into a buffer in protocol instruction interpreter data 311. Next, the message is checked. First, a checksum is performed, to make sure the message is uncorrupted. If the checksum is non-zero, a transmission error has occurred, and the machine returns to the start of the bootstrap state (diamond 505, 507). If the checksum is zero, a check is made if the message has the correct type (diamond 509). In a preferred embodiment, the first instruction is required to be the definition of the BYTEORDER for the lower interface. This byte-order definition specifies the order in which the bytes in a word sent according to the protocol are transmitted across the lower level interface: most or least significant byte first. It need not match the byte-order used in either the receiving or the sending entity. If the message is not a valid protocol description 203, interpreter 209 enters error 307 (511).

Figure 6:
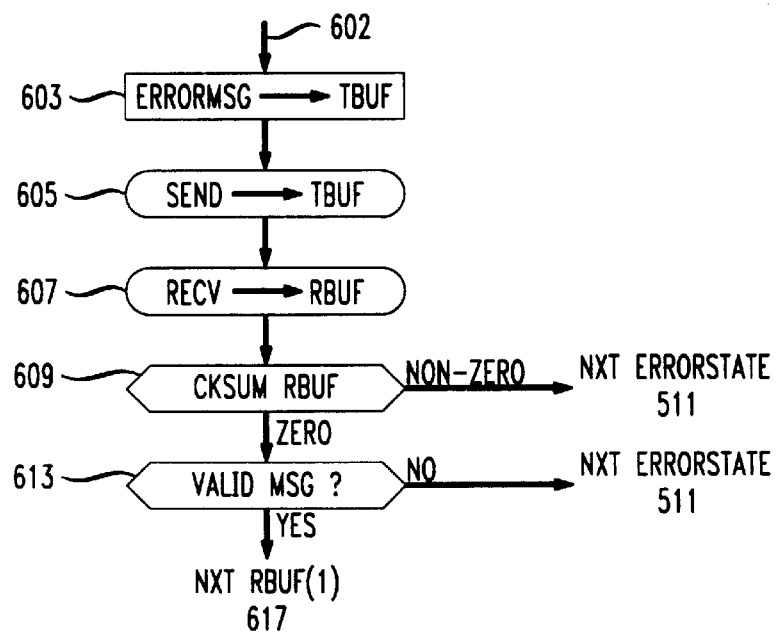
FIG. 6 is a flowchart of the error state.

If the message is a valid protocol description 203, the contents of receive buffer is assigned to the initial state of the newly loaded protocol, and control is transferred to that state (box 515). A full implementation 1101 of bootstrap 305 in protocol description language 401 is shown in FIG. 11.
Implementation of Error 307: FIG. 6

In a preferred embodiment, error component 307 is also implemented as a state of interpreter 209. Like the bootstrap state, this error state is part of the general protocol, not any specific protocol. It is only meant to provide a standard mechanism for responding to errors in the operation of the general protocol apparatus 301, such as stack-overflow, memory allocation errors, arithmetic errors (e.g., divide by zero), etc. A flowchart for the error state is given in FIG. 6.

As shown in FIG. 6, error component implementation 601 first writes a predefined error message to TBUF (box 603) and then notifies the remote protocol apparatus 107 of an error condition by sending the message in TBUF (oval 605). It then awaits a response that it will receive into the default receive buffer RBUF (oval 607). If the message was uncorrupted (diamond 609) and was a protocol decription 203 (diamond 613) control is transferred to the state that is specified in the message, using the NXT command (617). In all other cases (611,615), the error state is reentered from the top (602). A full implementation 1201 of error 307 in protocol description language 401 is shown in FIG. 12.
An Implementation of the Alternating Bit Protocol: FIGS. 7–10

Figure 7:
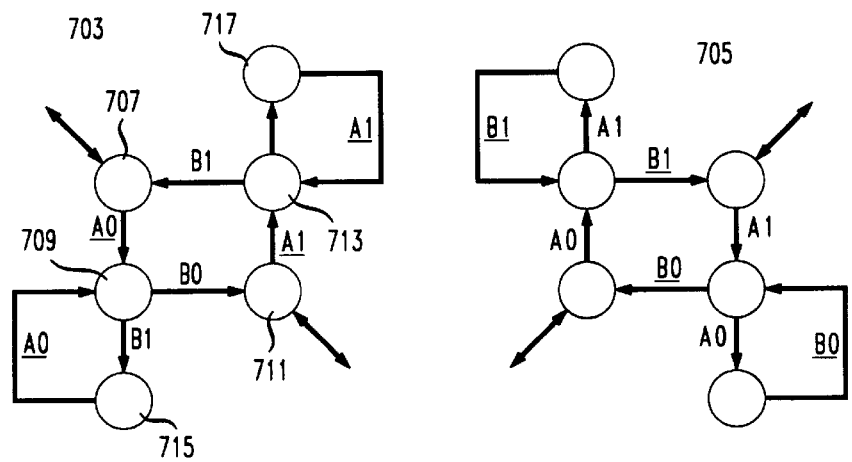
FIG. 7 is a state diagram for the alternating bit protocol.

FIG. 7 is a diagram of the finite state machines implemented by two protocol apparatuses 107 which are communicating by means of the alternating bit protocol. This protocol employs a single bit, which can have the value "1" or "0", as a message sequence number. When one of the apparatuses 107, say the apparatus represented by finite state machine 703, sends a message, it appends a "1" or an "0" bit as a sequence number to the message. The receiving finite state machine 705 sends an acknowledgment with the sequence number which it received to the sending finite state machine 705; if the acknowledgment's sequence number matches the sequence number of the sent message, the sending finite state machine can send another message with the other sequence number; if not, it repeats the last sent message.

In FIG. 7, the circles specify states and the edges specify state transitions resulting from message exchanges. The edge labels specify the message exchanges. Each label consists of two characters: A indicates that the message comes from finite state machine 703; B indicates that it comes from machine 705. The second character specifies the sequence number, 1 or 0 as described above. When an edge label is underlined, it indicates that the message is being transmitted to the other finite state machine. The double headed arrows indicate states in which the receiver can accept a message from the sender or the sender can fetch a new message for output to the receiver.

In more detail, in state 707, sender 703 receives a message A to be output to receiver 705. It appends the "0" sequence number and outputs the message. In state 709, it waits for the acknowledgment, indicated as the message B. If B has the sequence number "0", the next state is 711, where a new message A is received for output and the "1" sequence number is appended. In state 713, sender 703 waits for the acknowledgment, again indicated as B; if the message has the sequence number "1", the cycle begins again in state 707. If the acknowledgment received in state 709 has the sequence number "1", the next state is 715, which retransmits the message A transmitted in 707 with the "0" sequence number. If the right acknowledgment is received this time, the next state is 711; otherwise, state 715 is reentered. Similarly, if an A message with a sequence number "1" receives an acknowledgment with a sequence number "0", sender 703 goes to state 717, where it retransmits the A1 message.

FIG. 8 shows how the portion of the alternating bit protocol which responds to received messages is implemented using protocol description language 401. The code 801 for the receive portion of the protocol has three parts: in part 803, the buffers for both the transmit and receive portions are defined; for the receive portion, only three buffers are required: a transmit buffer TBUF, a receive buffer RBUF, and a variable VAR_E for the expected sequence number.

Portion 805 is state 0 of the portion of the finite state machine which receives messages. The protocol instructions 205 of state 0 are received in the general protocol message and are executed when bootstrap 305 transfers control to state 0. As required in a preferred embodiment, the first instruction is a BYTEORDER instruction, which here specifies that the first byte of the words received according to the protocol is the most significant byte. The instructions at bytes 2 through 10 of the general protocol message allocate buffer space for TBUF and VAR_E. The instructions at bytes 11 through 17 specify that the receiver is to wait for the next message, which contains the protocol instructions 205 of state 1, place that message in RBUF, load the contents of RBUF into the part of memory 309 reserved for protocol description 203, and associate state 1 with the location of the loaded contents in memory 309, and then execute state 1. The part of portion 805 beginning at byte 18 is reserved for the checksum which bootstrap 305 uses to check for correctness of transmission.

Portion 807 is state 1 of the portion of the finite state machine which receives messages. In this state, the finite state machine waits for a message (byte 0). When the message arrives, it is placed in RBUF. At bytes 2 through 12, the finite state machine writes a value indicating an acknowledgment (in this case, the character 'A') into the transmittal buffer, obtains the sequence number in the last byte of RBUF, copies the sequence number into TBUF following the 'A', and sends the acknowledgment. At bytes 14 through 20, the finite state machine compares the value of the sequence number retained in VAR_E with the sequence number in the last byte of RBUF. If they are the same, indicating that the received message had the right sequence number, bytes 23 through 33 are executed; otherwise, state 1 is again executed from the beginning, as shown at byte 34. In bytes 23 through 31, the sequence number saved in VAR_E is subtracted from 1 and the result saved in VAR_E again. Then, the message is sent to its destination and state 1 is again executed from the beginning.

FIG. 9 shows how the portion of the alternating bit protocol which sends messages is implemented in a preferred embodiment. In the preferred embodiment, protocol apparatus 107 in which send portion 901 is implemented is a protocol apparatus 201 or 301 which is sending to a protocol apparatus 301. Consequently, the send portion is implemented in protocol description language 401 and includes instructions which download receive portion 801 to the receiving protocol apparatus 301.

The buffers and variables used in portion 901 are defined in part 803 of FIG. 8. In the prototype, buffers 0 and 1 are preset to each contain a message; as may be seen from part 809 of FIG. 8, buffer 0 (named M0) is set to the ASCII character 'M' with the sequence number "0" appended to it, while buffer 1 is set to the ASCII character 'M' with the sequence number "1" appended to it. The buffer R_run contains the code of portion 807, while the buffer R_ini contains the code of portion 805. The buffer R_ack, finally, is used for the acknowledgement received from receiver 801. There are two variables: VAR_S, which holds the sequence number which is to be attached to the message, and VAR_CNT, which is a count of the number of bytes sent by the sender.

Returning to FIG. 9, the allocation and initialization of the sender buffers and variables defined in 803 takes place in section 903, which is state 0. In bytes 0–13, VAR_S and VAR_CNT are both allocated and set to 0; in bytes 14 and 15, receiver initialization code 805, contained in the buffer R_ini, is sent to the receiver; in bytes 16 and 17, the code 807 for state 1 of the receiver, contained in the buffer R_run, is sent to the receiver. These lines 905 thus perform the downloading of protocol description 203 to the receiving protocol apparatus 301. At byte 18, finally, the I_NXT instruction starts execution of state 1 907.

At bytes 0–2 of state 1 907, the current value of VAR_S is pushed onto the stack. At byte 3, SEND takes its parameter from the top of the stack; thus, if VAR_S has the value 0, the message in buffer M0 is sent; if it has the value 1, the message in buffer M1 is sent. In an embodiment for use in an actual communications system, there would be code preceding the SEND instruction which employed the OBTAIN instruction to obtain a byte of data to be sent and place the data in buffer M0 or M1, depending on the value of VAR_S, and then employed CPY_BYTE to append "0" or "1" to the data, again depending on the value of VAR_S.

The code in bytes 4–8 receives the acknowledgment from the receiver and pushes it onto the stack. As pointed out in the discussion of the receiver, the acknowledgment has the form 'A'<sequence_number>. The top byte of the stack consequently should contain 'A' and the next byte should contain the sequence number. In bytes 9–11, the top byte is checked to see whether it contains 'A'. If it does, bytes 14–31 are executed; otherwise, execution continues at byte 32. Bytes 14–31 check whether the acknowledgement has the right sequence number; if it does, they set VAR_S to the next sequence number. More specifically, bytes 14–20 check whether the sequence number in the acknowledgment is the same as the value of VAR_S. If it is not, execution continues at byte 32; if it is, VAR_S is set to its new value by subtracting its current value from 1 (bytes 23–31).

The code in bytes 32–54 updates VAR_CNT and terminates state 1 if the number of messages is greater than the constant NR_MSGS, defined in 803 to be 32765. In bytes 32–40, 1 is added to the current value of VAR_CNT. In bytes 41–47, VAR_CNT is pushed onto the stack, the most and least significant bytes of NR_MSGS is pushed onto the stack, and the two values are compared. If VAR_CNT>= NR_MSGS, bytes 50–52 put the value−1 on the stack. NXT returns that value to run, which thereupon terminates, as previously explained. Otherwise, byte 54 is executed, which causes state 1 907 to again begin execution.

Performance of Protocol Apparatus 201 or 301

The performance of the implementation of the alternating-bit protocol just described was compared with the performance of an implementation in which the sender and receiver were simply coded in the "C" programming language. The extra overhead caused by the use of protocol description 203 and interpreter 209 instead of a "C" program ranged from 10–30%, depending on the length of the message being transmitted (longer messages have the lower overhead). In many applications, the extra overhead will be offset by the fact that the protocol apparatus of the invention can interpret any protocol for which there is a protocol description 203. Further, there are many ways of reducing the overhead. Perhaps the most promising way is to implement interpreter 209 in hardware; such hardware would be capable of executing any protocol for which a protocol description 203 existed. Other optimizations include implementing interpreter 209 so that a minimum number of procedure calls are required, optimizing protocol descriptions 203 to avoid stack operations, and implementing interpreter 209 as an on-the-fly compiler, i.e., interpreter 209 operates by receiving protocol description 203 and compiling protocol description 203 into the machine instructions for the hardware which will actually implement the protocol. If the protocol apparatus is adaptive, the compilation would only have to be done before the first execution of the protocol description after it is loaded into the protocol apparatus.

Conclusion

The foregoing Detailed Description has disclosed to those of ordinary skill in the art how protocol apparatus may be constructed which is capable of executing any protocol for which there is a protocol description written in a given protocol language, how a sending protocol apparatus may provide a protocol description to a receiving protocol apparatus and thereby provide for execution of any protocol by the receiving protocol apparatus, and how a receiving protocol apparatus may be constructed which automatically adapts to the environment in which it is employed. Advantages of the techniques disclosed herein include more precise implementations of protocols, reduced implementation cost, and greatly increased flexibility.

While an example protocol description language and an example implementation of an interpreter for that protocol description language have been disclosed herein, it will be apparent to those of ordinary skill in the art that other protocol description languages and other implementations of the interpreter are possible. Moreover, other arrangements for downloading or otherwise specifying protocol descriptions may be used than those disclosed herein. That being the case, the Detailed Description is to be understood as being in all respects exemplary, but not restrictive, and the scope of the invention is to be determined not from the Detailed Description, but rather from the appended claims as interpreted in light of the Detailed Description and the doctrine of equivalents.

What is claimed is:

1. A method of communicating in a distributed system comprising the steps of:

in a first entity of the distributed system, receiving a first general protocol message which includes a protocol description which describes a specific protocol, the specific protocol described by the protocol description being initially unknown to the first entity, the protocol description being in a protocol description language which is independent of any particular hardware or software implementation of the first entity; and responding to the first general protocol message by employing first protocol description interpretation means to execute the protocol description included in the first general message which enables the first entity to communicate with a second entity of the distributed system using the specific protocol.

2. Protocol apparatus for communicating in a distributed system, the apparatus comprising:

in a first entity of the distributed system, means for storing a protocol description which describes a specific protocol, the protocol described by the protocol description being initially unknown to the first entity and in a protocol description language which is independent of any particular hardware or software implementation of the protocol apparatus; and means for executing the protocol description to implement the specific protocol and enabling the first entity to communicate with a second entity of the distributed system using the specific protocol.

3. A method for communicating data between elements of a distributed system, comprising:

receiving in a first element of the distributed system a first data message defining an arbitrary data communication protocol which is initially unknown to the first element and is independent from any particular hardware or software implementation of the first element;

configuring the first element to receive data formatted in the arbitrary data communication protocol defined in the first data message; and receiving, in the first element, at least one additional data message, the at least one additional data message transmitted using the arbitrary data communication protocol.

4. The method of communicating set forth in claim 3, wherein the step of configuring the first element includes:

determining whether the first data message has been correctly transmitted; and if the first data message was not correctly transmitted, returning to the step of receiving the first data message.

5. The method of communicating set forth in claim 3, wherein the step of configuring the first element includes:

determining whether the first data message is a valid first data message; and if the first data message is not valid, sending an error message.

6. The method of communicating set forth in claim 3, wherein the step of configuring the first element includes interpreting the arbitrary data communication protocol according to the at least one parameter contained in the first data message.

7. The method of communicating set forth in claim 6, wherein:
the at least one parameter specifies a byte order employed in the arbitrary data communication protocol; and
the step of interpreting the arbitrary data communication protocol includes interpreting the arbitrary data communication protocol according to the specified byte order.

8. The method of communicating set forth in claim 6, wherein:
the at least one parameter specifies a word size employed in the arbitrary data communication protocol; and
the step of interpreting the arbitrary data communication protocol includes interpreting the arbitrary data communication protocol according to the specified word size.

9. The method of communicating set forth in claim 3, further comprising:
sending the first data message from a second element to the first element; and
employing the arbitrary data communication protocol in communications between the first and second elements.

10. The method of communicating set forth in claim 9, further comprising responding to an error message which the first element provides to the second element in response to an error in the first data message.

11. The method of communicating set forth in claim 9, wherein the step of employing the arbitrary data communication protocol includes configuring the second element to receive data formatted in the arbitrary data communication protocol.

12. The method of communicating set forth in claim 3, wherein the step of configuring the first element includes directly executing instructions contained in the first data message and formatted in the arbitrary data communication protocol.

13. The method of communicating set forth in claim 3, wherein the step of configuring the first element includes compiling the arbitrary data communication protocol to produce instructions directly executable by means accessible to the first element.

14. The method set forth in claim 3, wherein the step of configuring the first element to receive data formatted in the arbitrary data communication protocol includes making the arbitrary data communication protocol included in the first data message accessible to the first element.

15. The method set forth in claim 3, further comprising:
receiving in the first element a second data message which defines a second arbitrary data communication protocol;
responding to the second data message by determining whether the second arbitrary data communication protocol is accessible to the first element;
if the second arbitrary data communication protocol is accessible, configuring the first element to interpret the second arbitrary data communication protocol; and
if the second arbitrary data communication protocol is not accessible, sending a first error message, and performing the step of receiving a first data message.

16. The method set forth in claim 15, wherein the step of receiving the first data message includes determining whether the arbitrary data communication protocol included in the first data message is equivalent to the second arbitrary data communication protocol.

17. The method set forth in claim 16, wherein the step of determining whether the arbitrary data communication protocol included in the first data message is equivalent to the second arbitrary data communication protocol includes sending a second error message if the arbitrary data communication protocol is not equivalent to the second arbitrary data communication protocol.

18. Protocol apparatus within a first element of a distributed system for communicating with other elements of the distributed system, the protocol apparatus comprising:
means for receiving a first data message which defines an arbitrary data communication protocol which is initially unknown to the first element and is independent from any particular hardware or software implementation of the first element; and
means for configuring the first element to receive data formatted in the arbitrary data communication protocol.

19. The protocol apparatus as set forth in claim 18, wherein the means for receiving a first data message checks the first data message to determine whether the first data message has been correctly transmitted; and
if the first data message has not been correctly transmitted, the means for configuring the first element does not configure the first element to receive data formatted in the arbitrary data communication protocol.

20. The protocol apparatus set forth in claim 18, wherein the means for receiving a first data message includes a checking and indicating means for checking the first data message and indicating whether the first data message is a valid first data message the protocol apparatus further comprising error handling means for sending an error message when the checking and indicating means indicates that the first data message is not valid.

21. The protocol apparatus set forth in claim 18, further comprising:
error handling means for sending an error message when an error occurs during operation of the means for configuring the first element to receive data formatted in the arbitrary data communication protocol.

22. The protocol apparatus set forth in claim 18, wherein:
the first data message includes at least one parameter for interpreting data transferred according to the arbitrary data communication protocol; and
the means for configuring the first element interprets the transmitted data according to the at least one parameter.

23. The protocol apparatus set forth in claim 22, wherein:
the at least one parameter specifies a byte order of the transmitted data; and
the means for configuring the first element interprets the transmitted data based on the specified byte order.

24. The protocol apparatus set forth in claim 22, wherein:
the at least one parameter specifies a word size of the transmitted data; and
the means for configuring the first element interprets the transmitted data based on the specified word size.

25. The protocol apparatus as set forth in claim 18, wherein the means for configuring the first element interprets the first data message by directly executing instructions contained in the first data message.

26. The protocol apparatus set forth in claim 18, wherein the means for configuring the first element interprets the first data message by compiling the first data message to produce instructions.

27. The protocol apparatus set forth in claim 18, wherein:
the protocol apparatus further includes error handling means;
the means for receiving the first data message further receives a second data message; and
the means for configuring the first element further includes:
means for receiving data formatted in a second arbitrary data communication protocol, and
means for determining whether the second arbitrary data communication protocol is accessible;
wherein,
if the second arbitrary data communication protocol is accessible, the configuring means interprets the second arbitrary data communication protocol, and
if the second arbitrary data communication protocol is not accessible, the configuring means sends a first error message.

28. The protocol apparatus set forth in claim 27, wherein the means for configuring the first element further makes accessible the arbitrary data communication protocol included in the first data message.

29. The protocol apparatus set forth in claim 27, wherein the means for configuring the first element further determines whether the arbitrary data communication protocol included in the first data message is the same as the second arbitrary data communication protocol.

30. The protocol apparatus set forth in claim 18, wherein the first data message is in a predetermined base format.

31. The protocol apparatus set forth in claim 30, wherein the predetermined base format includes a field specifying a word size.

32. The protocol apparatus set forth in claim 30, wherein the predetermined base format includes a field specifying a byte order.

33. An apparatus for communicating between computers in a distributed system, comprising:
a first data processing apparatus of the distributed system configured in a data communication protocol;
a second data processing apparatus of the distributed system configured in an arbitrary data communication protocol;
wherein the first data processing apparatus includes:
receiving means for receiving from the second data processing apparatus a general message that defines the arbitrary data communication protocol which is initially unknown to the first data processing apparatus and is independent from any particular hardware or software implementation of the first data processing apparatus, and
configuring means for placing the first data processing apparatus into the arbitrary data communication protocol defined by the general message, wherein the receiving means is able to receive an additional message in the arbitrary data communication protocol from the second data processing apparatus.

34. The apparatus for communicating set forth in claim 33, wherein the configuring means further makes the arbitrary data communication protocol accessible to the first data processing apparatus.

35. The apparatus for communicating set forth in claim 33, wherein:
the second data processing apparatus includes error handling means;
the receiving means further receives a second general message including a second arbitrary data communication protocol; and
the configuring means determines whether the second arbitrary data communication protocol is accessible, wherein, if the configuring means determines the second arbitrary data communication protocol is accessible, the configuring means interprets the second arbitrary data communication protocol, and if the configuring means determines the second arbitrary data communication protocol is not accessible, the receiving means sends a first error message to the second data processing apparatus.

36. The apparatus for communicating set forth in claim 35, wherein the configuring means further determines whether the arbitrary data communication protocol is the same as the second arbitrary data communication protocol.

37. A method for communicating data between a first data processing apparatus and a second data processing apparatus, the method comprising:
transmitting a first data message defining an arbitrary data communication protocol, which is initially unknown to the first data processing apparatus and is independent from any particular hardware or software implementation of the first data processing apparatus, to the first data processing apparatus from the second data processing apparatus, at least a first portion of the first data message being in the predetermined data communication protocol;
placing the first data processing apparatus into the arbitrary data communication protocol defined in the first data message; and
transmitting at least one additional data message between the first data processing apparatus and second data processing apparatus, the at least one additional message in the arbitrary data communication protocol defined in the first data message.

38. The method for communicating data set forth in claim 37, wherein the first data processing apparatus and the second data processing apparatus are computers.

39. The method for communicating data set forth in claim 37, wherein one of the first data processing apparatus and the second data processing apparatus is a peripheral apparatus.

40. A method for transmitting data to a first element of a distributed system, the method comprising:
receiving, in the first element, a first data message defining an arbitrary data communication protocol which is initially unknown to the first element and is independent from any particular hardware or software implementation of the first element, at least a first portion of the first data message being in the predetermined data communication protocol;
placing the first element into the arbitrary data communication protocol defined by the first data message; and
receiving, in the first element, at least one additional data message, the at least one additional data message in the arbitrary data communication protocol defined in the first data message.

41. A method for communicating between communications devices, comprising:
receiving, using a general protocol, a first message at a first communications device containing a protocol definition defining a specific protocol to be used for subsequent messages;
executing the received protocol definition to implement the specific protocol at the first communications device; and
receiving, at the first communications device, the subsequent messages using the specific protocol.

42. The method for communicating between communications devices as set forth in claim 41, wherein the first message comprises a set of messages.

43. A method for communicating between communication devices, comprising:

receiving, using a general protocol, a first message at a first communications device identifying a specific protocol to be used for subsequent messages;

determining if a protocol description corresponding to the specific protocol is available to the first communications device and if the protocol description corresponding to the specific protocol is stored in the memory, transmitting an acknowledge message, otherwise transmitting an error message;

in response to the error message, receiving a second message using the general protocol containing the protocol description for the specific protocol;

executing the received protocol definition to implement the specific protocol at the first communications device; and receiving, at the first communications device, the subsequent messages using the specific protocol.

44. A communications device capable of communicating with other communications devices, comprising:

a communications circuit for routing communications messages to and from the other communications devices and transferring data to and from the communications device; and a protocol apparatus that implements protocols used to communicate with the other communications devices, the protocol apparatus comprising:

a memory for storing at least one protocol definition, each protocol definition defining a corresponding protocol and being in a communications device-independent protocol description language, a protocol interpreter that executes the stored protocol definition to implement the corresponding protocol, and a bootstrap interpreter that inputs a message received from one of the other communications devices, the message being in a general protocol and containing a protocol definition defining a received protocol, stores the received protocol definition in the memory, and causes the protocol interpreter to execute the received protocol definition to implement the received protocol, and enables the communications device to receive subsequent messages from the one other communications device using the received protocol.

45. A communications device capable of communicating with other communications devices, comprising:

a communications circuit that processes communication messages from the other communications devices, at least one of the communication messages specifying a protocol definition;

a protocol apparatus that implements a protocol used to control communication sessions with the other communications devices, comprising:

a memory for storing at least one protocol definition, each protocol definition defining a corresponding protocol and being in an independent protocol description language;

a protocol instruction interpreter that executes a protocol definition stored in the memory; and a bootstrap interpreter that inputs a message received from one of the other communications devices, the message containing a protocol definition, stores the received protocol definition in the memory, and causes the protocol instruction interpreter to execute the received protocol definition.

46. A protocol for communicating between elements, comprising:

a resident portion, the resident portion present in each element; and a non-resident portion that is transmittable from a first one of the elements to the second one of the elements, subsequent communications between the first and second elements performed based on the non-resident portion of the protocol.

* * * * *